Feb. 20, 1934.    E. MANASEK    1,947,560
AIRCRAFT PROPELLER
Filed Jan. 7, 1931    2 Sheets-Sheet 1
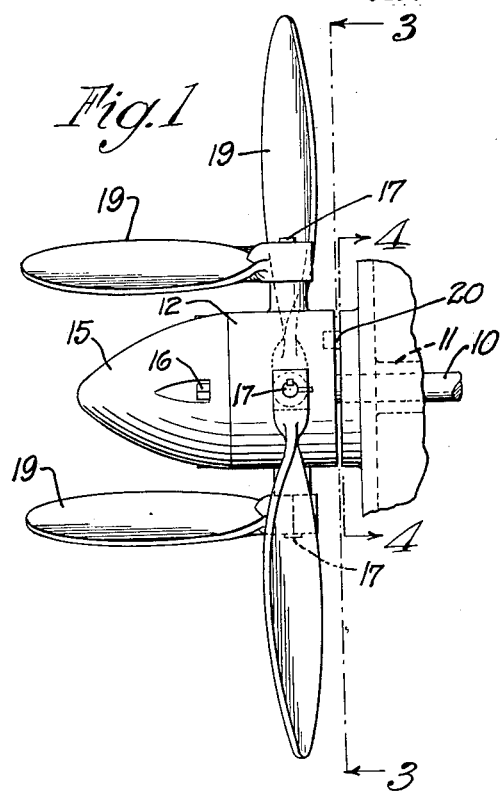
Fig.1
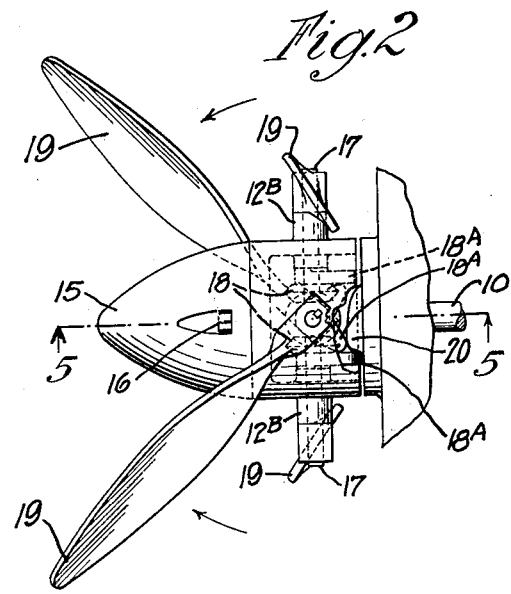
Fig.2
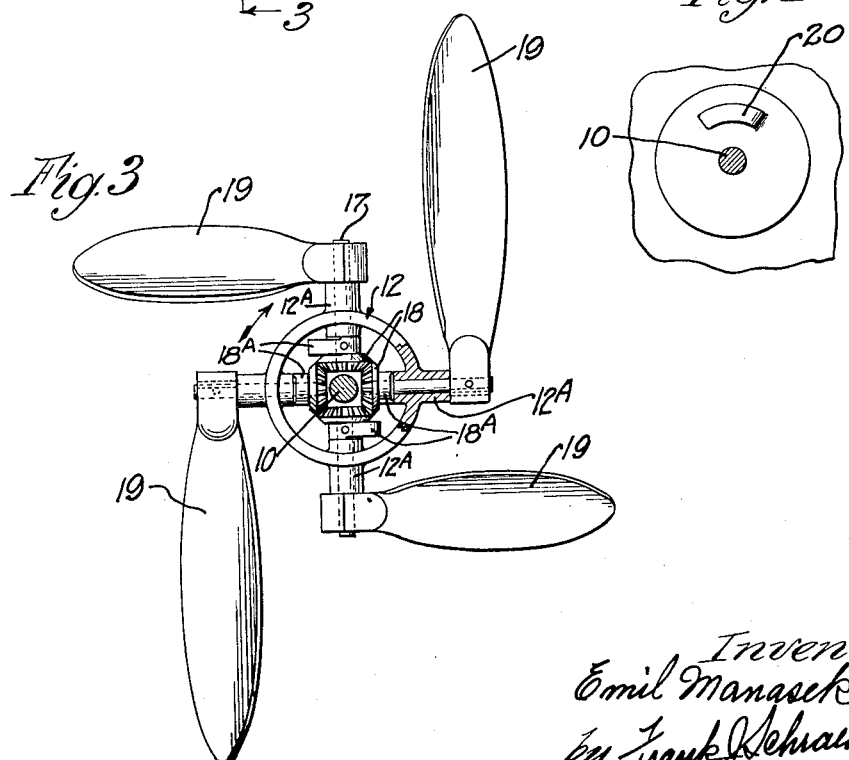
Fig.3
Fig.4
Inventor
Emil Manasek
by Frank J. Schraeder
Attorney.

Feb. 20, 1934.   E. MANASEK   1,947,560
AIRCRAFT PROPELLER
Filed Jan. 7, 1931   2 Sheets-Sheet 2
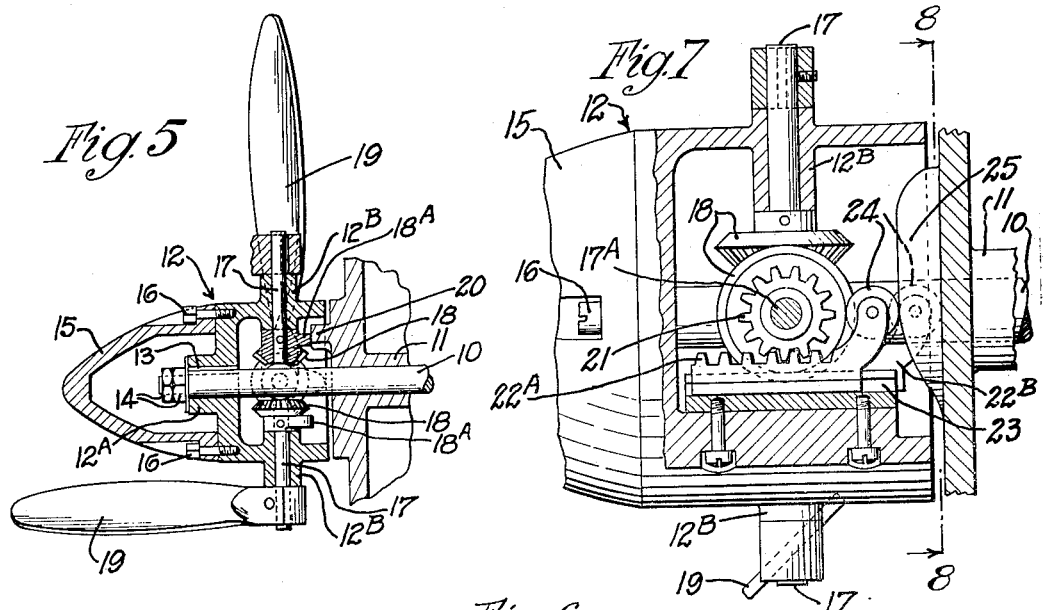
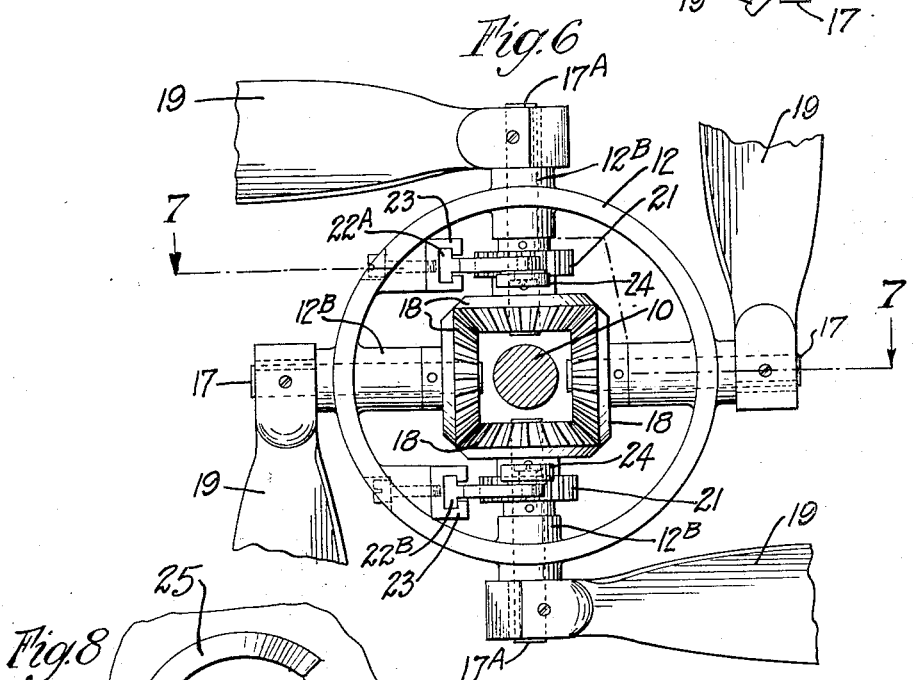
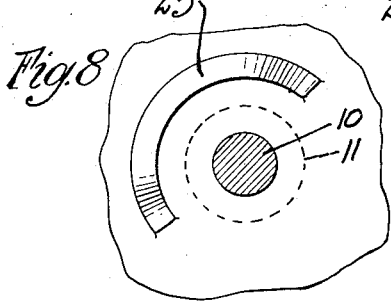

Patented Feb. 20, 1934

1,947,560

UNITED STATES PATENT OFFICE 1,947,560

AIRCRAFT PROPELLER

Emil Manasek, Berwyn, Ill.

Application January 7, 1931. Serial No. 507,107

3 Claims. (Cl. 170—49)

This invention relates to aircraft propellers and has among its objects to provide a new and useful propeller which shall be readily adaptable for use in connection with various types of aircraft for increasing and facilitating the propelling power thereof.

Another object of the invention is to provide a plurality of aircraft propeller blades which in addition to their revolving motion shall be intermittently oscillated back and forth during their revolution to thereby increase their tractive or propelling power during flight.

With the above and other objects in view, my invention consists in the novel combination and construction of the various parts and members shown in one embodiment in the attached drawings, described in the following specifications and particularly pointed out in the appended claims.

Referring to the illustrations:—

Fig. 1 is a side elevation of an aircraft propeller embodying my invention.

Fig. 2 is a plan view of the propeller shown in Fig. 1.

Fig. 3 is a sectional view taken on line 3—3 of Fig. 1, showing the mechanism for oscillating the propeller blades.

Fig. 4 is a section taken on line 4—4 of Fig. 1, showing the cam for successively operating the pairs of propellers.

Fig. 5 is a longitudinal section through the propeller head.

Fig. 6 is a cross section through a modified form of mechanism for oscillating the propeller blades.

Fig. 7 is a section taken on line 7—7 of Fig. 6.

Fig. 8 is a sectional view taken on line 8—8 of Fig. 7.

Referring now to the form of propeller shown in Figs. 1 to 5 inclusive, the engine-driven propeller shaft 10 is shown extending through a bearing 11 into the portion 12A of the propeller head 12, which head 12 is rigidly connected in any suitable manner, as for instance with the key 13 and nuts 14, with the shaft 10.

A pointed tip 15 is secured to the head 12 by means of bolts 16.

The head 12 in the present instance, is provided with a plurality of pairs of integrally cast bearings 12B which support oscillatable shafts 17. On the inner end of each shaft 17 is a bevel gear 18 rigidly secured to the shaft 17 and formed with an adjacent ear or lug 18A. On the outer end of each shaft 17 and rigidly mounted thereto is a propeller blade 19. Each blade is perpendicularly disposed to its supporting shaft 17 and obviously pitched at the desirable angle relatively to longitudinal axis of the shaft 17.

The propeller blades 19 of each pair of oppositely disposed shafts 17 are also normally oppositely disposed to each other and in their intermittent oscillating movement they move simultaneously in opposite directions to angular positions as shown generally by the arrows in Fig. 2.

The propeller blades 19 as shown in Figs. 1 to 5 inclusive are preferably shown to oscillate forwardly but it is obvious that same could readily be mounted on shafts 17 to oscillate rearwardly of the vertical plane intersecting the centers of gears 18.

It is readily apparent from Fig. 3, that the intermeshing gears 18 afford a simultaneous oscillation of all propeller blades 19 which oscillation occurs two times during each revolution of the head 12 through the successive engagement of the lugs 18A with the cam 20.

In the modification shown in Figs. 6, 7 and 8 the interconnected gears 18 do not have the lugs 18A but instead two of the oppositely disposed shafts 17A are provided with pinions 21 which are rigidly secured to such shafts and which pinions 21 are adapted to be turned by racks 22A and 22B.

The racks 22A and 22B are slidably mounted in guides 23 and at one end thereof are provided with rollers 24 which during the revolution of the head 12, alternately engage the cam 25 whereby each rack is successively moved forwardly to turn its respective pinion 21 and gear 18 to thereby intermittently oscillate all four propeller blades 19, one pair forwardly and the other pair rearwardly. By the arrangement shown in Figs. 6, 7 and 8, the all of the propeller blades 19 oscillate forwardly and rearwardly once during each revolution of the head 12.

I claim:

1. An aircraft propeller comprising a drive shaft, a revolving head fixed to said drive shaft, a plurality of bearings on said head, a propeller shaft mounted in each of said bearings, said propeller shafts being disposed angularly to said drive shaft, a gear fixed to one end of each of said shafts within said head, said gears being in mesh with one another, a propeller blade fixed to the other end of each of said propeller shafts, the longitudinal axis of each of said propeller blades being disposed at a right angle to its propeller shaft, and means for oscillating said blades during their revolution.

2. An aircraft propeller comprising a drive shaft, a revolving head fixed to said drive shaft, a plurality of bearings on said head, a propeller shaft mounted in each of said bearings, said propeller shafts being disposed angularly to said drive shaft, a gear fixed to one end of each of said shafts within said head, said gears being in mesh with one another, a propeller blade fixed to the other end of each of said propeller shafts, the longitudinal axis of each of said propeller blades being disposed at a right angle to its propeller shaft, and stationary means for oscillating said blades during their revolution.

3. An aircraft propeller comprising a drive shaft, a revolving head fixed to said drive shaft, two pairs of bearings on said head, a propeller shaft mounted in each of said bearings, said propeller shafts being disposed at a right angle to said drive shaft, a gear fixed to one end of each of said shafts within said head, said gears being in mesh with one another, a propeller blade fixed to the other end of each of said propeller shafts, the longitudinal axis of each of said propeller blades being disposed at a right angle to its propeller shaft, and stationary means for simultaneously oscillating said propeller shafts and propeller blades in pairs, in opposite directions.

EMIL MANASEK.